(12) United States Patent
Hillyer et al.

(10) Patent No.: US 8,758,843 B1
(45) Date of Patent: Jun. 24, 2014

(54) PROCESS FOR THE MANUFACTURE OF AN ANIMAL FEED BLOCK

(71) Applicant: Carrs Agriculture Limited, Carlisle (GB)

(72) Inventors: Nigel John Hillyer, Cheshire (GB); Edward Atherton, Cumbria (GB)

(73) Assignee: Carrs Agriculture Limited, Carlisle (GB)

( * ) Notice: Subject to any disclaimer, the term of this patent is extended or adjusted under 35 U.S.C. 154(b) by 45 days.

(21) Appl. No.: 13/632,975

(22) Filed: Oct. 1, 2012

(51) Int. Cl.
*A23K 1/00* (2006.01)

(52) U.S. Cl.
USPC .............................. 426/231; 426/54; 426/523

(58) Field of Classification Search
CPC ...................................................... A23K 1/00
USPC ........... 426/54, 231, 623, 630, 635, 807, 285, 426/519; 366/603, 141–142, 151.1–151.6; 141/1, 83
See application file for complete search history.

(56) References Cited

U.S. PATENT DOCUMENTS

| | | | | |
|---|---|---|---|---|
| 3,203,591 A | * | 8/1965 | Daulton et al. ................... | 222/2 |
| 3,246,336 A | * | 4/1966 | Baribo et al. ..................... | 426/2 |
| 3,806,001 A | * | 4/1974 | Pratt .............................. | 222/132 |
| 3,895,117 A | * | 7/1975 | Backlund ........................ | 426/69 |
| 3,961,081 A | * | 6/1976 | McKenzie ...................... | 426/658 |
| 4,631,192 A | | 12/1986 | Mommer et al. | |
| 4,749,578 A | * | 6/1988 | Benton et al. .................... | 426/74 |
| 4,846,053 A | | 7/1989 | Lane et al. | |
| 5,340,211 A | * | 8/1994 | Pratt .............................. | 366/141 |
| 5,482,729 A | * | 1/1996 | McKenzie et al. ............. | 426/635 |
| 6,126,986 A | | 10/2000 | Harris | |
| 6,143,335 A | * | 11/2000 | McKenzie ....................... | 426/72 |
| 6,168,803 B1 | | 1/2001 | Harris | |
| 6,291,008 B1 | * | 9/2001 | Robie et al. .................... | 426/620 |
| 6,440,478 B1 | | 8/2002 | Benton | |
| 6,726,941 B2 | * | 4/2004 | Ethington et al. ................ | 426/2 |
| 7,645,471 B2 | | 1/2010 | Harris | |
| 7,927,641 B2 | | 4/2011 | Harris | |
| 8,079,750 B2 | * | 12/2011 | Freeman et al. ........... | 366/152.2 |
| 8,182,848 B2 | | 5/2012 | Harris | |
| 8,277,111 B1 | * | 10/2012 | Englot ........................ | 366/138 |
| 8,424,572 B2 | * | 4/2013 | Fu .................................... | 141/9 |
| 2004/0018288 A1 | | 1/2004 | Westberg | |
| 2011/0064865 A1 | * | 3/2011 | McCurdy et al. ............. | 426/623 |

FOREIGN PATENT DOCUMENTS

| | | | | |
|---|---|---|---|---|
| BE | 891011 A | * | 3/1982 | ............... A23K 1/02 |
| CA | 2486238 | | 4/2006 | |
| EP | 931454 A1 | * | 7/1999 | ............... A01K 5/00 |
| GB | 2434732 | | 8/2007 | |
| WO | 2003015532 | | 2/2003 | |

OTHER PUBLICATIONS

Search Report for corresponding European Patent Application No. 13182053.2.

* cited by examiner

*Primary Examiner* — Steven Leff
(74) *Attorney, Agent, or Firm* — Stites & Harbison PLLC; Richard S. Myers, Jr.

(57) ABSTRACT

The present invention relates to a process for the manufacture of an animal feed block according to a target constituent formulation. The process eliminates spoiling of product by inconsistent and fluctuating levels of active ingredient and wet ingredients so as to ensure repeatability from one batch to another.

19 Claims, 1 Drawing Sheet

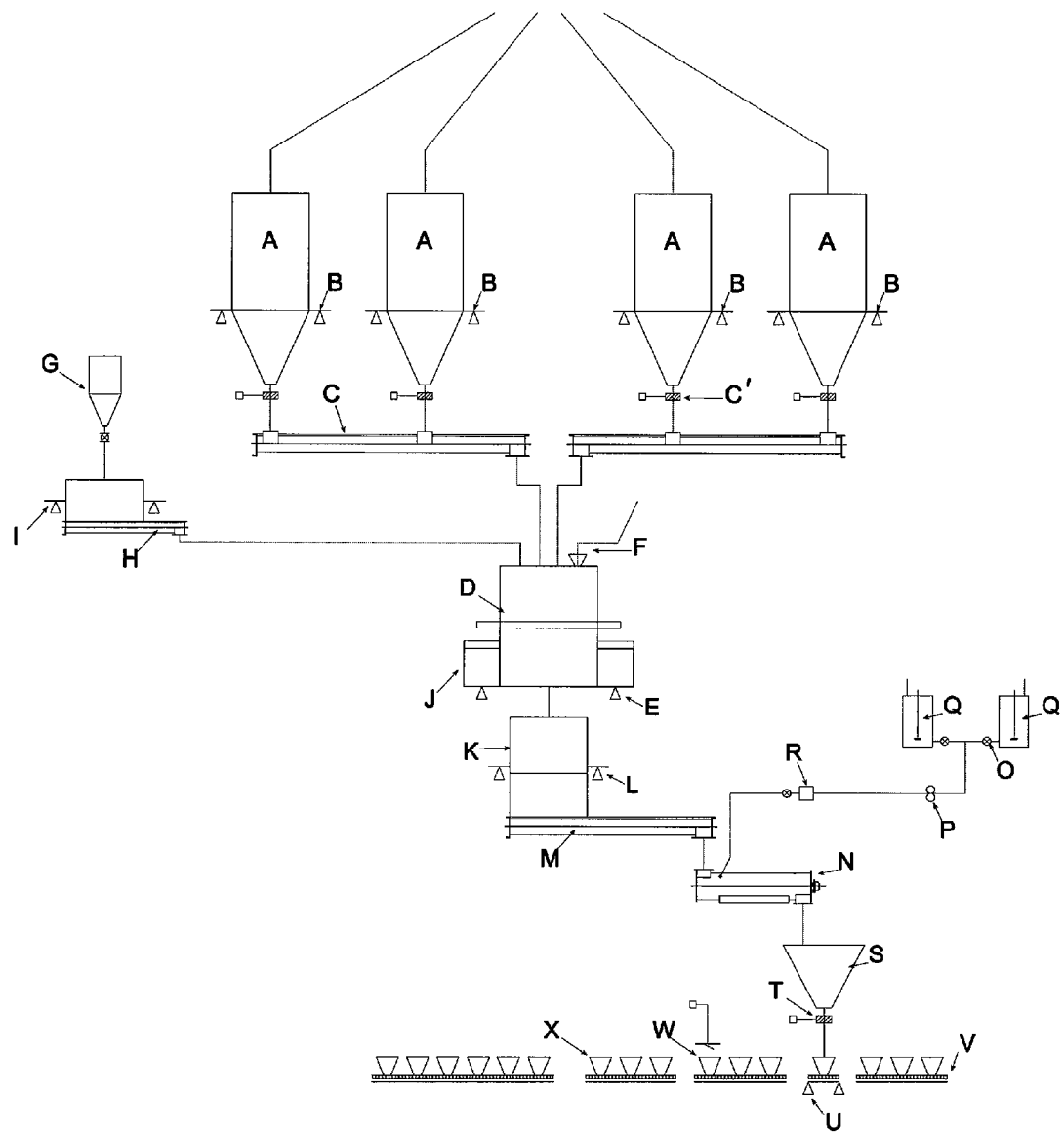

PROCESS FOR THE MANUFACTURE OF AN ANIMAL FEED BLOCK

FIELD OF THE INVENTION

The present invention relates to a process for the manufacture of an animal feed block according to a target constituent formulation.

BACKGROUND OF THE INVENTION

Solid animal feed blocks are becoming increasingly popular in the farming community. Feed blocks provide a combination of wet and dry feed grade raw materials formulated to provide nutritional value to ruminant animals and are a convenient way to administer regulated quantities of nutraceuticals, vitamins, minerals or proteins over a period of time.

Production methods for feed blocks involve chemical reactions and may require varying degrees of heat and a catalyst such as calcium oxide (CaO) or magnesium oxide (MgO). The oxides hydrate when they come into contact with moisture contained in the wet materials. Many chemical reactions which occur during production of a feed block are not fully understood and bear a resemblance to cement chemistry. Control of these reactions is difficult and significant waste material is a feature of the industry. Inconsistent product quality can occur with only minor adjustments in quantity, weight or particle size of the ingredients being used. These adjustments have a direct impact upon the severity of the reaction during formulation.

OBJECTS OF THE INVENTION

It is an object of the present invention to provide a continuous process for the manufacture of a precisely nutritionally formulated animal feed block which ensures that accurate quantities of pre-blended dry ingredients and pre-blended wet ingredients are mixed with an accurate relative amount of an active ingredient to a predetermined consistency. It is a further object of the present invention to eliminate the spoiling of formulation by inconsistent and fluctuating levels of active ingredient and wet ingredients so as to ensure repeatability from one batch to another.

SUMMARY OF THE INVENTION

According to a first aspect of the invention, there is provided a process for manufacturing an animal feed block according to a target constituent formulation in an apparatus which comprises:
  in a dry feeding zone, a first dry feeder which includes a first dry hopper charged with a dry pre-mix and a first material handling conveyor and a second dry feeder which includes a second dry hopper charged with an active ingredient and a second material handling conveyor,
  in a dry mixing zone downstream from the dry feeding zone, a dry mixer and an under hopper downstream from the dry mixer,
  in a liquid feeding zone, a first liquid feeder which includes a first liquid feeding device and a first liquid tank charged with a wet pre-mix which includes a liquid by-product and a liquid additive,
  a slurry mixer downstream from the dry mixing zone and the liquid feeding zone and
  a dispensing assembly downstream from the slurry mixer, the process comprising:

(A1) discharging and conveying the dry pre-mix from the first dry hopper to the dry mixer by the first material handling conveyor;
(A2) measuring the cumulative weight of the dry pre-mix in the dry mixer;
(A3) calculating a target weight of active ingredient to be conveyed to the dry mixer, wherein the target weight of the active ingredient and the cumulative weight of the dry pre-mix are constituently proportionate to the target constituent formulation;
(A4) discharging and conveying the active ingredient from the second dry hopper to the dry mixer by the second material handling conveyor;
(A5) during step (A4)
  a. either measuring the loss in weight of the active ingredient in the second dry hopper and causing step (A4) to cease when the loss in weight of the active ingredient equates to the target weight of the active ingredient calculated in step (A3)
  b. or measuring the weight of dry material in the dry mixer and causing step (A4) to cease when the weight of dry material in the dry mixer equates to the sum of the target weight of the active ingredient calculated in step (A3) and the cumulative weight of the dry pre-mix measured in step (A2);
(B1) mixing the active ingredient and the dry pre-mix in the dry mixer into a substantially homogeneous dry mix;
(B2) discharging the substantially homogeneous dry mix into the under hopper;
(B3) measuring the weight of the substantially homogeneous dry mix in the under hopper;
(B4) discharging and conveying the substantially homogeneous dry mix from the under hopper to the slurry mixer;
(B5) measuring the rate of the loss in weight of the substantially homogeneous dry mix in the under hopper during step (B4);
(C1) calculating a target flow rate of the wet pre-mix to be conveyed to the slurry mixer, wherein the target flow rate of the wet pre-mix and the rate of the loss in weight of the substantially homogeneous dry mix measured in step (B5) are constituently proportionate to the target constituent formulation;
(C2) discharging and conveying the wet pre-mix from the first liquid tank to the slurry mixer at an actual flow rate;
(C3) measuring the actual flow rate of the wet pre-mix;
(C4) adjusting continuously the actual flow rate to achieve the target flow rate;
(D1) mixing the substantially homogeneous dry mix and the wet pre-mix in the slurry mixer into a substantially homogeneous slurry;
(E1) discharging the substantially homogeneous slurry into the dispensing assembly;
(E2) dispensing the substantially homogeneous slurry portionwise from the dispensing assembly into receptacles; and
(E3) allowing the substantially homogeneous slurry in each receptacle to cool to form an animal feed block.

In another embodiment, step (A5) is carried out during step (A4) by measuring the weight of dry material in the dry mixer and causing step (A4) to cease when the weight of dry material in the dry mixer equates to the sum of the target weight of the active ingredient calculated in step (A3) and the cumulative weight of the dry pre-mix measured in step (A2).

The process may further comprise:
  a. (A6) calculating a target weight of wet pre-mix to be conveyed to the slurry mixer, wherein the target weight of the wet pre-mix and the cumulative weight of the dry pre-mix are constituently proportionate to the target constituent formulation.

Typically the process is carried out without heating. For example, the animal feed block is a chemical feed block which is formed exothermically during steps (C), (D) and (E).

The process may further comprise: heating the wet pre-mix to a temperature between ambient and 40 C. The heating step may serve to improve and maintain a constant viscosity and ensure consistent reaction during step (D1).

The amount of wet pre-mix in the target constituent formulation may be in the range of from about 30 to 40 wt %.

The amount of dry pre-mix in the target constituent formulation may be in the range of from about 55 to 65 wt %.

The ratio of the weight of wet pre-mix to dry pre-mix in the target constituent formulation may be in the range of from about 0.50:1 to 0.60:1.

The liquid by-product is typically a liquid by-product of feed value to ruminating animals. The liquid by-product may be an agricultural liquid by-product (i.e. the liquid by-product of the refinement of an agricultural raw material).

The amount of liquid by-product in the target constituent formulation may be in the range of from about 25 to 40 wt %, preferably 30 to 35 wt %.

The liquid by-product may be selected from the group consisting of sugar cane molasses, sugar beet molasses, starch molasses, citrus (eg apple) molasses, pot ale syrup, whey, corn steep liquor, stillage and a mixture thereof.

Preferably the liquid by-product is a liquid carbohydrate-containing by-product. The liquid carbohydrate-containing by-product may be a sugar or a syrup.

A preferred liquid by-product is (or includes) molasses. The amount of molasses in the target constituent formulation may be up to 40 wt %. The amount of molasses in the target constituent formulation may be in the range of from about 5 to 15 wt %, preferably 9 to 11 wt %.

In one example, the liquid by-product is (or includes) corn steep liquor.

In another example, the liquid by-product is (or includes) molasses and corn steep liquor.

The liquid additive may be a source of carbohydrate, a source of nitrogen, a source of protein, a source of fat, an acid (eg sulphuric acid) or a base.

In one example, the liquid additive is vegetable oil. The amount of vegetable oil in the target constituent formulation may be in the range of from about 2.0 to 3.0 wt %.

The vegetable oil may be corn oil, soy oil, palm oil or maize oil.

The active ingredient is typically an alkaline earth metal oxide. The alkaline earth metal oxide is preferably calcium oxide (eg quick lime) and/or magnesium oxide. Calcium oxide (eg quicklime) is particularly preferred.

The amount of active ingredient in the target constituent formulation may be in the range 3.0 to 7.0 wt %.

Typically the dry pre-mix comprises a dry protein and a dry mineral.

The dry pre-mix may further comprise a source of carbohydrate, a source of nitrogen (eg urea), a source of protein or a source of fat. The dry pre-mix may further comprise a mineral.

The dry pre-mix may further comprise a dry ingredient selected from the group consisting of a vitamin, a mineral (eg limestone), a protein, a flavouring, a colourant, a preservative, a pharmaceutical, a stabiliser, a fat, a nutritional supplement, a dietary supplement (eg sodium chloride), a carbohydrate, soapstock, urea, lignin sulphonate, lecithin and fibres.

The process may further comprise:

a. (A7) adding one or more dry additives to the dry mixer.

Step (A7) may be carried out by hand (eg using a hand additives facility).

The (or each) dry additive may be a source of carbohydrate, a source of nitrogen (eg urea), a source of protein or a source of fat. Each of the one or more dry additives may be a mineral. The dry additive may enhance the physical properties (eg durability or anti-caking) of the feed block.

The (or each) dry additive may be selected from the group consisting of a vitamin, a mineral (eg limestone), a protein, a flavouring, a colourant, a preservative, a pharmaceutical, a stabiliser, a fat, a nutritional supplement, a dietary supplement (eg sodium chloride), a carbohydrate, soapstock, urea, lignin sulphonate, lecithin and fibres.

Step (B2) may be carried out gravitationally.

Measuring steps (A2), (B3) and (B5) may be carried out by a load cell.

The receptacles may be mounted on a receptacle conveyor.

The process may further comprise:

a. (E2a) advancing the receptacles consecutively on a receptacle conveyor to beneath a mechanical leveler;
b. (E2b) mechanically levelling the homogeneous slurry in each receptacle using the mechanical leveler.

The mechanical leveler may include a rotary knife positionable at or near to the rim of the receptacle to spread the homogeneous slurry evenly across the receptacle.

The process may further comprise:

a. (E2c) moving the receptacles onto a labelling conveyor for consecutive labelling.

In step (E1), the substantially homogeneous slurry may be poured, pumped, extruded or conveyed from the dispensing assembly into the receptacles.

The actual flow rate of the wet pre-mix measured in step (C3) may be a volume flow rate or a mass flow rate.

The wet pre-mix in the first liquid tank may be agitated.

The process may further comprise:

a. (A8) adding one or more additional liquid additives to the first liquid tank.

Step (A8) may be carried out by hand (e.g., using a hand additives facility).

The one or more additional liquid additives may contribute to achieving the target constituent formulation or ensure full homogenisation in step (D1).

The apparatus may further comprise in the liquid feeding zone one or more additional liquid feeders, wherein each additional liquid feeder includes an additional liquid feeding device and an additional liquid tank. The (or each) additional liquid tank may be charged with the wet pre-mix.

Typically the (or each) liquid feeding device includes a liquid pump and a flow meter. The flow meter may be a volume or mass flow meter. Preferred is a mass flow meter.

The (or each) liquid feeding device may include a discharge valve downstream from the liquid tank.

The apparatus may further comprise in the dry feeding zone one or more additional dry feeders, wherein each additional dry feeder includes an additional dry hopper and an additional material handling conveyor. In the process of the invention, the (or each) additional dry hopper may be charged with the dry pre-mix. An additional dry hopper may be charged with a dry additive.

The (or each) dry feeder may comprise a downstream valve.

Each material handling conveyor may be a screw feeding device equipped with single feed or twin feed screws. The screw feeding device may be equipped with twin concave-profile screws, twin auger screws, single spiral screws, double spiral screws, twin spiral screws or single auger screws. The screw feeding device may be variable speed.

The dry mixer may be a paddle-type mixer (eg a Forberg paddle-type mixer).

Typically the speed of the slurry mixer in step (D1) is in the range 300 to 800 rpm. The slurry mixer may be a Scott slurry mixer.

Step (B4) is preferably carried out by a variable speed material handling conveyor. For example, the homogeneous dry mix may be conveyed to the slurry mixer by the variable speed material handling conveyor at a speed in the range 10 to 20 tons per hour (eg about 15 tons per hour).

Preferably when the actual flow rate approximates consistently to the target flow rate, the process further comprises:

(D2) locking the speed of the slurry mixer;

(D3) locking the speed of the variable speed material handling conveyor.

Preferably the process further comprises:

(D4) causing step (C2) to cease when the rate of the loss in weight measured in step (B5) is zero.

The process may be partly or fully computer-controlled. A computer may control one or more of the steps of the process. Sensors may also be provided for monitoring each step of the process and the apparatus. The sensors may include temperature sensors, weight sensors, strain gauges, pressure sensors or vacuum sensors. Each of the steps may be controlled by a programmable logic controller.

BRIEF DESCRIPTION OF THE DRAWING

FIG. 1 illustrates an apparatus for carrying out an embodiment of the process of the invention.

DESCRIPTION OF THE INVENTION

The apparatus illustrated in FIG. 1 primarily comprises a dry feeding zone, a dry mixing zone downstream from the dry feeding zone, a liquid feeding zone, a slurry mixer downstream from the dry mixing zone and the liquid feeding zone and a dispensing assembly downstream from the slurry mixer.

Described below is an embodiment of a process for the manufacture of a single batch of animal feed blocks according to a target constituent formulation carried out in the apparatus illustrated in FIG. 1. The process may be applied equally to continuous batch production and ensures consistency of the formulation from one batch to the next.

Step (1)

Dry ingredients are supplied in a dry pre-mix which is conveyed by either a pneumatic or material handling means (not shown) to batch hoppers (A) in the dry feeding zone. A load cell (B) fitted to each batch hopper (A) measures the actual weight of the dry pre-mix in the batch hopper (A).

Step (2)

In the dry mixing zone, a high speed mixer (D) is equipped downstream with an under hopper (K). The dry pre-mix is discharged from the batch hoppers (A) via a pneumatic gate valve (C') and conveyed into the high speed mixer (D) by a material handling conveyor (C). Load cells (E) fitted to the high speed mixer (D) measure the precise cumulative weight of the dry pre-mix in the high speed mixer (D).

Step (3)

A process control system records the cumulative weight of the dry pre-mix in the high speed mixer (D) and calculates a target weight of an active ingredient. The target weight of the active ingredient and the cumulative weight of the dry pre-mix are constituently proportionate to the target constituent formulation.

Step (3) effectively compensates for any loss of dry pre-mix that may have occurred in the material handling conveyor (C) and pneumatic gate valve (C').

Step (4)

The process control system prompts the operator by alarm to make any requisite micro-addition of dry additives by hand to the high speed mixer (D) using a hand additives facility (F). The operator then confirms to the process control system by means of an individual pin number that any requisite micro-additions are complete.

Step (5)

The active ingredient contained within an active ingredient hopper (G) is discharged and conveyed into the high speed mixer (D) by a material handling conveyor (H). Load cells (I) located on the base of the active ingredient hopper (G) accurately measure the loss in weight of the active ingredient from the active ingredient hopper (G). The process control system monitors this loss in weight and when it equates to the target weight of the active ingredient calculated in step (3), the material handling conveyor (H) is shut off.

The effect of step (5) is to constituently proportionate the weight of active ingredient conveyed to the high speed mixer (D) and the cumulative weight of the dry ingredients recorded in step (3) (and any requisite micro-additions in step (4)) to the target constituent formulation.

Step (6)

The process control system then activates the mixer cycle (time) according to the desired consistency of the target constituent formulation to ensure that a fully homogeneous dry mix of the dry pre-mix, any requisite micro-additions and active ingredient is achieved within the high speed mixer (D).

Following completion of the mixer cycle (time) the process control system releases the homogeneous dry mix from the high speed mixer (D) into the under hopper (K) by opening the bomb doors (J). When the load cells (E) measure zero, the process control system closes the bomb doors (J).

Step (7)

Load cells (L) mounted on the under hopper (K) measure the actual weight of homogeneous dry mix in the under hopper (K) prior to the inclusion of the wet ingredients.

In the liquid feeding zone, the wet ingredients are supplied in a wet pre-mix which is housed in liquid storage tanks (Q). A discharge valve (O) and liquid pump (P) serve to discharge and convey the wet pre-mix through a pipe to a slurry mixer (N).

Step (8)

The process control system starts the discharge of homogeneous dry mix which is conveyed by a material handling conveyor (M) from the under hopper (K) into the slurry mixer (N). The process control system opens the discharge valve (O) and starts the liquid pump (P) to convey the wet pre-mix from the liquid storage tanks (Q) to the slurry mixer (N).

The process control system monitors the rate of the loss in weight of the homogeneous dry mix from the under hopper (K) measured by the load cells (L). The rate of the loss in weight is used by the process control system to calculate a target mass flow rate of wet pre-mix to be combined with the homogeneous dry mix at the inlet to the slurry mixer (N). The target mass flow rate of wet pre-mix and the rate of the loss in weight of the substantially homogeneous dry mix are constituently proportionate to the target constituent formulation.

A flow meter (R) measures continuously the actual mass flow rate of wet pre-mix. The process control system monitors the actual mass flow rate. By varying the speed of the liquid pump (P) to adjust the actual mass flow rate towards the target mass flow rate, the process control system constituently proportionate the rate of the loss in weight of the homogeneous dry mix and the actual mass flow rate of wet pre-mix to the target constituent formulation.

The process control system controls the speed of the slurry mixer (N) according to the desired consistency of the target constituent formulation.

Step (9)

The homogeneous dry mix and wet pre-mix are homogenised within the slurry mixer (N) on a continuous first in first out basis and the homogeneous slurry is discharged directly into a mechanical tub filler (S). The mechanical tub filler (S) ensures accurate and consistent flow of the homogeneous slurry into a tub at a filling and weighing station (U).

A filling control gate (T) is controlled by the process control system and opens in response to a signal from the filling and weighing station (U) that an empty tub is in place under the mechanical tub filler (S). The process control system monitors the weight of homogeneous slurry being discharged into the tub at the filling and weighing station (U) and closes the filling control gate (T) at the target weight.

The process control system records the final weight in the tub and starts the tub conveying line (V). The tub is moved forward from the filling and weighing station (U) to beneath a tub levelling conveyor (W). At the same time the next tub moves into position at the filling and weighing station (U) and the filling steps are repeated.

The tub levelling conveyor (W) includes a rotary knife positioned at the rim of the full tub to spread the homogeneous slurry evenly across the top of the full tub before the process control system move the full tub onto a labelling conveyor (X). The homogeneous slurry then solidifies to produce a glassy feed block upon cooling to ambient temperature.

The tub is then hand stacked onto pallets and placed into storage ready for dispatch.

EXAMPLE

The Examples presented herein are solely for exemplary purposes. The present invention is not to be construed as being limited to the Examples. In other embodiments, the ranges, amounts, or parameters are considered to be modified by the term "about."

This example is a process for the manufacture of a batch of formulation having a target weight of 2000 lbs carried out in the apparatus illustrated in FIG. 1. The target constituent formulation of weight 2000 lbs is made up of the following ingredients:

| Ingredient | Percentage | Weight (lbs) |
|---|---|---|
| Wet Ingredients | | |
| 1364 Corn Steep Liquor | 22.20 | 444.00 |
| 1369 Sulphuric Acid | 1.50 | 30.00 |
| 1373 Cane Molasses, 79.5 Brix | 10.00 | 200.00 |
| 1374 Vegetable oil | 2.45 | 49.00 |
| Total Wet Ingredients | 36.15 | 723.00 |
| Dry Ingredients | | |
| 1378 Am. Lignin Sulfonate | 8.60 | 172.00 |
| 1380 Urea 55% | 8.75 | 175.00 |
| TASCO Tasco | 2.00 | 40.00 |
| 0005 Rice Mill Feed | 15.00 | 300.00 |
| 1069 Distiller's Grains | 8.20 | 163.97 |
| 1812 Limestone | 6.95 | 139.00 |
| 1379 Salt (Sodium Chloride) | 6.90 | 138.00 |
| 1419 Calcium Oxide | 3.50 | 70.00 |
| 1770 Selenium 1% | 0.03 | 0.63 |
| 1901 SL Trace Mineral | 0.37 | 7.40 |
| 2011 Vit ADE Block Premix | 0.05 | 1.0 |
| Total Dry Ingredients | 60.35 | 1207 |
| Active Ingredient | | |
| MAGOX-56% HR | 3.50 | 70.00 |
| Total Active Ingredient | 3.50 | 70.00 |

| Process Parameters | |
|---|---|
| Forberg Mix Time | 60 seconds |
| Batch Process Time | 12 minutes/20 ton per hour |
| Scott Mixer Speed | 365 rpm |
| Target Wet to Dry Ratio | 0.56 lb/1 lb |
| Target Dry to Wet | 1 lb/0.5 lbs |
| Tub Capacity | 50 lbs |
| Tub Filling Gate Shut Off | 45 lbs |
| In Flight Value | 5 lbs |
| Hand Additives Required | No |

The dry ingredients specified above are supplied in a dry pre-mix which is purchased from a third party supplier or are blended by a third party blending system. A target weight of the dry pre-mix of 1207 lbs according to the target constituent formulation is conveyed by either a pneumatic or material handling means (not shown in FIG. 1) to batch hoppers (A) in the dry feeding zone.

A load cell (B) fitted to each batch hopper (A) measures the actual weight of the dry pre-mix (1150 lbs) in the batch hoppers (A). The process control system records the actual weight of the dry pre-mix in the batch hoppers (A). By means of mathematical calculation, the target weight of dry pre-mix to be conveyed to a high speed Forberg paddle-type mixer (D) is adjusted by the process control system to the actual weight of the dry pre-mix:

target dry pre-mix=1207 lbs/actual dry pre-mix=1150 lbs

The dry pre-mix (1150 lbs) is discharged from the batch hoppers (A) via a pneumatic gate valve (C') and conveyed into the high speed Forberg paddle-type mixer (D) by a material handling conveyor (C).

Load cells (E) fitted to the high speed Forberg paddle-type mixer (D) measure the actual cumulative weight of the dry pre-mix (1100 lbs) in the high speed Forberg paddle-type mixer (D).

Revised target dry pre-mix=1150 lbs/actual cumulative dry pre-mix=1100 lbs (dry batch size reduced by 9%)

The process control system records the actual cumulative weight of dry pre-mix (1100 lbs). By means of mathematical calculation, the target weights of active ingredient and wet pre-mix are adjusted proportional to the reduction in weight of dry pre-mix:

| target dry pre-mix | 1207 lbs (60.35%) | revised target cumulative dry pre-mix | 1100 lbs (−9%) |
|---|---|---|---|
| target active ingredient | 70 lbs (3.5%) | revised target active ingredient | 63 lbs (−9%) |
| target wet pre-mix | 723 lbs (36.15%) | revised target wet pre-mix | 658 lbs (−9%) |

The revised total target weight of dry material is 1163 lbs (1100+63). The load cells (E) fitted to the high speed Forberg paddle-type mixer (D) measure the total weight of dry material in the high speed Forberg paddle-type mixer (D). The process control system records the total weight of dry material in the high speed Forberg paddle-type mixer (D). Active ingredient is discharged and conveyed from active ingredient hopper (G) into the high speed Forberg paddle-type mixer (D) by material handling conveyor (H) until the total weight of dry material measured by the load cells (E) and recorded by the process control system equates to the revised total target weight of dry material (1163 lbs).

The process control system then starts the high speed Forberg paddle-type mixer (D) and implements a mix time of 60 seconds. After the mix time has elapsed the process control system opens the bomb doors (J) of the high speed Forberg paddle-type mixer (D) and the homogeneous dry mix is discharged into the under hopper (K).

Load cells (L) mounted on the under hopper (K) measure the actual weight of homogeneous dry mix in the under hopper (K) prior to the inclusion of the wet pre-mix. The actual weight of homogeneous dry mix is recorded by the process control system.

Weight of dry material in high speed Forberg paddle-type mixer (D)–1163 lbs/actual weight of homogeneous dry mix–1163 lbs (no loss in weight during transfer)

The homogeneous dry mix is discharged from the under hopper (K) and conveyed by a variable speed material handling conveyor (M) into a Scott slurry mixer (N)). The process control system sets the speed of the material handling conveyor (M) to the formulated batch process rate (30 ton per hour). The process control system confirms the batch process rate is achieved by monitoring the rate of loss in weight from the under hopper (K) measured by the load cells (L). The rate of the loss in weight is used by the process control system to calculate a target mass flow rate of wet pre-mix to be combined with the homogeneous dry mix at the inlet to the slurry mixer (N). The target mass flow rate of wet pre-mix and the rate of the loss in weight of the substantially homogeneous dry mix are constituently proportionate to the target constituent formulation.

The wet ingredients are blended into a wet pre-mix by a third party system. In the liquid feeding zone, the wet pre-mix is stored in the liquid storage tanks (Q) and agitated continuously to keep the wet ingredients in suspension in the wet pre-mix.

The process control system opens the discharge valve (O) under the liquid storage tanks (Q) and starts the liquid pump (P) to convey the wet pre-mix from the liquid storage tanks (Q) to the slurry mixer (N).

A flow meter (R) measures continuously the actual mass flow rate of wet pre-mix. The process control system monitors the actual mass flow rate. By varying the speed of the liquid pump (P) to adjust the actual mass flow rate towards the target mass flow rate, the process control system constituently proportionates the rate of the loss in weight of the homogeneous dry mix and the actual mass flow rate of wet pre-mix to the target constituent formulation. Thus for every 1 lb of homogeneous dry mix lost from the under hopper (K) and entering the Scott slurry mixer (N) the process control system adjusts the speed of liquid pump (P) to deliver 0.56 lbs of wet pre-mix.

The process control system sets the speed of the Scott slurry mixer (N) (range 300 rpm to 800 rpm) to the formulated mixing speed of 350 rpm.

When optimisation is complete, the process control system locks down the speed settings on frequency converters controlling the speed of the Scott slurry mixer (N) and the material handling conveyor (M).

The homogeneous dry mix and wet ingredients are homogenised within the slurry mixer (N) on a continuous first in first out basis and the homogeneous slurry is discharged directly into a mechanical tub filler (S). The mechanical tub filler (S) ensures accurate and consistent flow of the homogeneous slurry into a tub at a filling and weighing station (U).

A filling control gate (T) is controlled by the process control system and opens in response to a signal from the filling and weighing station (U) that an empty tub is in place under the mechanical tub filler (S). The process control system monitors the weight of homogeneous slurry being discharged into the tub at the filling and weighing station (U) and closes the filling control gate (T) at the target weight.

The process control system records the final weight in the tub and starts the tub conveying line (V). The tub is moved forward from the filling and weighing station (U) to beneath a tub levelling conveyor (W). At the same time the next tub moves into position at the filling and weighing station (U) and the filling steps are repeated.

The tub levelling conveyor (W) includes a rotary knife positioned at the rim of the full tub to spread the homogeneous slurry evenly across the top of the full tub before the process control system move the full tub onto a labelling conveyor (X). The homogeneous slurry then solidifies to produce a glassy feed block upon cooling to ambient temperature.

The tub is then hand stacked onto pallets and placed into storage ready for dispatch.

The invention thus being described, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the Specification be considered as exemplary only, and not intended to limit the scope and spirit of the invention.

The terms "a", "an", and "the" refer to "one or more" when used in this application, including the claims. Thus, for example, reference to "a composite" includes a plurality of such composites, and so forth.

Unless otherwise indicated, all numbers expressing quantities of ingredients, properties such as reaction conditions, and so forth used herein are to be understood as being modified in all instances by the term "about." Accordingly, unless indicated to the contrary, the numerical parameters set forth in the herein are approximations that may vary depending upon the desired properties sought to be determined by the present invention.

We claim:

1. A process for manufacturing an animal feed block according to a target constituent formulation in an apparatus which comprises
   (A) in a dry feeding zone, a first dry feeder which includes a first dry hopper charged with a dry pre-mix and a first material handling conveyor and a second dry feeder which includes a second dry hopper charged with an active ingredient and a second material handling conveyor,
   (B) in a dry mixing zone downstream from the dry feeding zone, a dry mixer and an under hopper downstream from the dry mixer, (C) in a liquid feeding zone, a first liquid feeder which includes a first liquid feeding device and a first liquid tank charged with a wet pre-mix which includes a liquid by-product and a liquid additive, (D) a slurry mixer downstream from the dry mixing zone and the liquid feeding zone and (E) a dispensing assembly downstream from the slurry mixer, the process comprising:

(A1) discharging and conveying the dry pre-mix from the first dry hopper to the dry mixer by the first material handling conveyor;

(A2) measuring the cumulative weight of the dry pre-mix in the dry mixer;

(A3) calculating a target weight of active ingredient to be conveyed to the dry mixer, wherein the target weight of the active ingredient and the cumulative weight of the dry pre-mix are constituently proportionate to the target constituent formulation;

(A4) discharging and conveying the active ingredient from the second dry hopper to the dry mixer by the second material handling conveyor;

(A5) during step (A4)

either measuring the loss in weight of the active ingredient in the second dry hopper and causing step (A4) to cease when the loss in weight of the active ingredient equates to the target weight of the active ingredient calculated in step (A3)

or measuring the weight of dry material in the dry mixer and causing step (A4) to cease when the weight of dry material in the dry mixer equates to the sum of the target weight of the active ingredient calculated in step (A3) and the cumulative weight of the dry pre-mix measured in step (A2);

(B1) mixing the active ingredient and the dry pre-mix in the dry mixer into a substantially homogeneous dry mix;

(B2) discharging the substantially homogeneous dry mix into the under hopper;

(B3) measuring the weight of the substantially homogeneous dry mix in the under hopper;

(B4) discharging and conveying the substantially homogeneous dry mix from the under hopper to the slurry mixer;

(B5) measuring the rate of the loss in weight of the substantially homogeneous dry mix in the under hopper during step (B4);

(C1) calculating a target flow rate of the wet pre-mix to be conveyed to the slurry mixer, wherein the target flow rate of the wet pre-mix and the rate of the loss in weight of the substantially homogeneous dry mix measured in step (B5) are constituently proportionate to the target constituent formulation;

(C2) discharging and conveying the wet pre-mix from the first liquid tank to the slurry mixer at an actual flow rate;

(C3) measuring the actual flow rate of the wet pre-mix;

(C4) adjusting continuously the actual flow rate to achieve the target flow rate;

(D1) mixing the substantially homogeneous dry mix and the wet pre-mix in the slurry mixer into a substantially homogeneous slurry;

(E1) discharging the substantially homogeneous slurry into the dispensing assembly;

(E2) dispensing the substantially homogeneous slurry portionwise from the dispensing assembly into receptacles; and (E3) allowing the substantially homogeneous slurry in each receptacle to cool to form an animal feed block.

2. The process as recited in claim 1 further comprising:

(A6) calculating a target weight of wet pre-mix to be conveyed to the slurry mixer, wherein the target weight of the wet pre-mix and the cumulative weight of the dry pre-mix are constituently proportionate to the target constituent formulation.

3. The process as recited in claim 1 wherein the dry pre-mix comprises a dry protein and a dry mineral.

4. The process as recited in claim 1 wherein the liquid by-product is or includes molasses.

5. The process as recited in claim 1 wherein step (A5) is carried out during step (A4) by measuring the weight of dry material in the dry mixer and causing step (A4) to cease when the weight of dry material in the dry mixer equates to the sum of the target weight of the active ingredient calculated in step (A3) and the cumulative weight of the dry pre-mix measured in step (A2).

6. The process as recited in claim 1 carried out without heating.

7. The process as recited in claim 1 wherein step (B4) is carried out by a variable speed material handling conveyor.

8. The process as recited in claim 7 wherein when the actual flow rate approximates consistently to the target flow rate, the process further comprises:

(D2) locking the speed of the slurry mixer;

(D3) locking the speed of the variable speed material handling conveyor.

9. The process as recited in claim 1 further comprising:

(D4) causing step (C2) to cease when the rate of the loss in weight measured in step (B5) is zero.

10. The process as recited in claim 1 wherein the ratio of the weight of wet pre-mix to dry pre-mix in the target constituent formulation is in the range 0.50:1 to 0.60:1.

11. The process as recited in claim 1 wherein the amount of liquid by-product in the target constituent formulation is in the range 30 to 35 wt %.

12. The process as recited in claim 1 wherein the liquid by-product is selected from the group consisting of sugar cane molasses, sugar beet molasses, starch molasses, citrus molasses, pot ale syrup, whey, corn steep liquor, stillage and a mixture thereof.

13. The process as recited in claim 4 wherein the amount of molasses in the target constituent formulation is in the range 9 to 11 wt %.

14. The process as recited in claim 1 wherein the liquid additive is vegetable oil.

15. The process as recited in claim 1 wherein the active ingredient is calcium oxide.

16. The process as recited in claim 15 wherein the amount of active ingredient in the target constituent formulation is in the range 3.0 to 4.0 wt %.

17. The process as recited in claim 1 wherein the dry pre-mix comprises a source of carbohydrate, a source of nitrogen, a source of protein or a source of fat.

18. The process as recited in claim 1 wherein the dry pre-mix comprises a dry ingredient selected from the group consisting of a vitamin, a mineral, a protein, a flavouring, a colourant, a preservative, a pharmaceutical, a stabiliser, a fat, a nutritional supplement, a dietary supplement, a carbohydrate, soapstock, urea, lignin sulphonate, lecithin, fibres and a mixture thereof.

19. The process as recited in claim 1 further comprising:

(E2a) advancing the receptacles consecutively on a receptacle conveyor to beneath a mechanical leveler;

(E2b) mechanically levelling the homogeneous slurry in each receptacle using the mechanical leveler.

* * * * *